US006388894B1

(12) United States Patent
Paggi et al.

(10) Patent No.: US 6,388,894 B1
(45) Date of Patent: May 14, 2002

(54) PRE-WIRING DEVICE FOR CONTACTORS

(75) Inventors: Serge Paggi, Ruffey-les-Echirey; Thierry Fort, Rueil-Malmaison, both of (FR)

(73) Assignee: Schneider Electric Industries SA, Rueil-Malmaison (FR)

( * ) Notice: Subject to any disclaimer, the term of this patent is extended or adjusted under 35 U.S.C. 154(b) by 0 days.

(21) Appl. No.: 09/709,407

(22) Filed: Nov. 13, 2000

(30) Foreign Application Priority Data

Nov. 12, 1999 (FR) ........................................... 99 14413

(51) Int. Cl.[7] .............................. H01R 9/00; H02P 3/18
(52) U.S. Cl. ............................ 361/823; 318/759; 337/6
(58) Field of Search ................................ 388/800–937; 310/68 R, 71, 68 A, 68 D, 72, 154, 45, 184–187; 361/822–825, 601, 679; 318/34–164, 362–382, 759; 337/6

(56) References Cited

U.S. PATENT DOCUMENTS

| | | | | | |
|---|---|---|---|---|---|
| 3,581,168 | A | * | 5/1971 | Kirkby | 318/211 |
| 3,638,157 | A | * | 1/1972 | Kruzic | 337/6 |
| 4,895,005 | A | * | 1/1990 | Norbeck | 62/506 |

FOREIGN PATENT DOCUMENTS

| | | |
|---|---|---|
| DE | G 88 04 649.4 | 7/1988 |
| EP | 0 387 158 | 9/1990 |
| EP | 0 467 170 A2 | 1/1992 |
| EP | 0 717 425 A1 | 6/1996 |
| EP | 0 806 784 A2 | 11/1997 |
| EP | 0 818 797 A1 | 1/1998 |
| EP | 0 891 026 A1 | 1/1999 |

* cited by examiner

*Primary Examiner*—Jayprakash N. Gandhi
*Assistant Examiner*—Michael L. Lindinger
(74) *Attorney, Agent, or Firm*—Oblon, Spivak, McClelland, Maier & Neustadt, P.C.

(57) ABSTRACT

A pre-wiring device creating a logic function such as an inverter function or a star-delta start function between at least two multi-pole contactors located side by side and used particularly in electrical control equipment of motors. A same pre-wiring device allows connections to be made in an identical way to several sizes of contactors which reduces accordingly the number of different terminal bars to be designed and manufactured. According to a characteristic of the invention, this pre-wiring device includes an upstream pre-wiring terminal bar 30 fitted with metal pins 31 to be inserted into the upstream wiring terminal blocks 11 of the contactors. The pre-wiring device also includes a downstream pre-wiring terminal bar.

8 Claims, 4 Drawing Sheets

PRE-WIRING DEVICE FOR CONTACTORS

BACKGROUND OF THE INVENTION

1. Field of the Invention

The present invention relates to a pre-wiring device allowing a logic function such as an inverter function or a star-delta start function to be created between at least two multi-pole contactors intended to be used particularly in electrical control equipment of motors.

2. Discussion of the Background

The use of a pre-wiring device to create a logic function between several multi-pole contactors is well known. For example in the case of an inverter function effected on two three-pole contactors, this pre-wiring device must connect two by two the input poles of the two contactors by direct connections and must connect two by two the output poles by connections by making a permutation of two contactors relative to the input order. Such a device thus simplifies the task of installers by offering them a pre-wired function, ready to be connected to the contactors and which may be created from terminal bars installed upstream and/or downstream of several contactors located one next to the other.

Nonetheless these pre-wiring devices are generally adapted to the size of the contactors for which they are intended so as to enable easy and safe mechanical and electrical connections. This therefore involves different mechanical components for each size of contactor. The purpose of the invention is to offer a pre-wiring device which will make it possible to connect in an identical way to several sizes of contactor which will reduce accordingly the number of different terminal bars to be designed and manufactured and which will also simplify component stock control by the manufacturer and by the installer.

SUMMARY OF THE INVENTION

According to a characteristic of the invention, the pre-wiring device to create a logic function between at least two multi-pole contactors located side by side includes an upstream pre-wiring terminal bar coated in insulating material, installed above the contactors and fitted with metal pins able to be inserted in the housings of the upstream wiring terminal blocks of the contactors. This upstream terminal bar includes on its lower face stop means which come into support on the upper plane surface of the upstream terminal blocks of a first type of contactors and which are shielded on a second type of contactors the upper face of which has adapted notches. The pre-wiring device also includes a downstream pre-wiring terminal bar installed under the contactors, constituted by a comb coated in an insulating material and equipped with teeth from which emerge, along a direction approximately perpendicular to the plane of the downstream terminal bar, metal pins able to be inserted in the housings of the downstream wiring terminal blocks of the contactors. The teeth of this downstream terminal bar come into support against the lower plane face of the downstream terminal blocks of a first type of contactor and in notches provided on the lower face of the downstream terminal blocks of a second type of contactors.

Other characteristics and advantages will emerge in the following detailed description with reference to embodiments given as examples and shown in the appended drawings in which:

DESCRIPTION OF THE PREFERRED EMBODIMENTS

Figure 1:
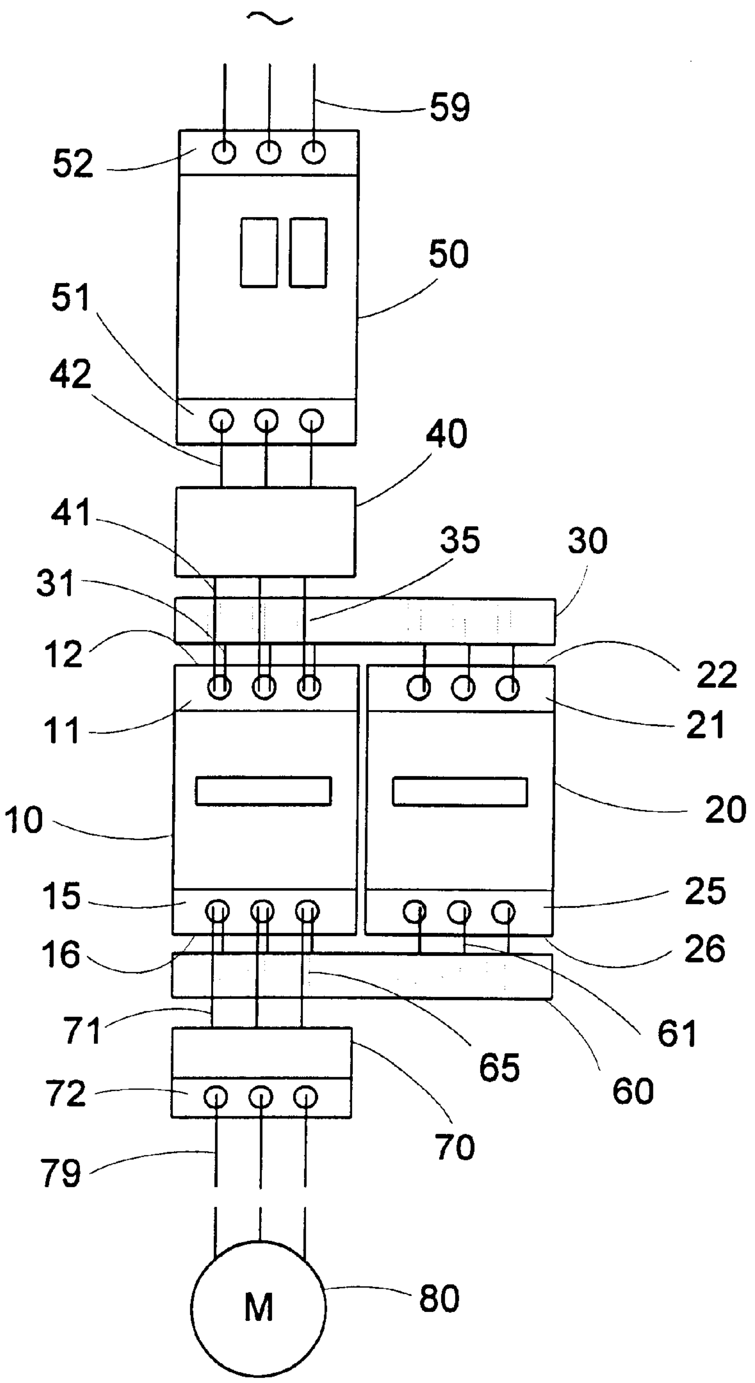
FIG. 1 shows a composite connection example of electrical devices used to make the power circuit for controlling a three-pole bi-directional device.

FIG. 1 shows a composite connection example of different electrical devices used to make the power circuit for controlling a three-pole device 80, such as a bi-directional motor. In this figure, the electrical power supply is provided by three conductors 59 which are connected to the upstream terminal block 52 of a protective device, such as a motor circuit breaker 50. Downstream from this circuit breaker, there is an interface component 40 between circuit breaker and contactor intended to facilitate for the installer the mounting and the wiring of the contactor/circuit breaker unit. This interface component is fitted on one side with an upstream row of pins 42 connected to the downstream terminal block 51 of the breaker 50, and on the other side with a downstream row of pins 41 connected to the upstream terminal block 11 of a first contactor 10. A second identical contactor 20 is placed next to the first contactor 10. These two contactors are used to control the motor 80, along a first direction when the contactor 10 is closed and the contactor 20 is open and along a second direction when the contactor 20 is closed and the contactor 10 is open, the two contactors being controlled by means of a control circuit not shown in this figure.

A pre-wiring device intended to create a function inverting the power phases between the two contactors 10, 20 is constituted by an upstream pre-wiring terminal bar 30 and by a downstream pre-wiring terminal bar 60.

The upstream pre-wiring terminal bar 30, of a width approximately equal to the width of the two contactors, is pinned against the upper faces 12, 22 of the upstream terminal blocks 11, 21 of the contactors 10, 20, so as to be located between the interface component 40 and the contactors 10, 20. This terminal bar has metal pins 31 which come to insert themselves in the housings of the upstream terminal blocks 11, 21 of the contactors 10, 20. Moreover, the upstream terminal bar 30 has cavities 35 allowing the downstream pins 41 of the interface component 40 to be able to pass through it so as to connect also to the upstream terminal block 11. In the case of an inverter function, the role of the upstream terminal bar is to connect two by two the upstream terminals of the two contactors 10, 20.

The downstream pre-wiring terminal bar 60, of a width approximately equal to the width of the two contactors, is pinned against the lower faces 16, 26 of the downstream terminal blocks 15, 25 of the contactors 10, 20. It has metal pins 61 which come to insert themselves in the housings of the downstream terminal blocks 15, 25 of the contactors 10, 20. In the case of an inverter function, the role of the downstream terminal bar is to connect two by two the downstream terminals of the two contactors 10, 20, by making an inversion between two poles.

To the downstream terminal block 15 of the contactor 10, may be connected the pins 71 of an attachment 70, such as a thermal relay intended to protect the motor 80, in such a way that the downstream terminal bar 60 is located between this attachment 70 and the two contactors 10, 20. To this end, the downstream terminal bar 60 has cavities 65 allowing the pins 71 of the attachment 70 to be able to pass through it to connect directly to the downstream terminal block 15 of the contactor 10. Lastly, three conductors 79 connect the downstream terminal block 72 of the attachment 70 to the motor 80.

It is of course possible to make other power circuits for controlling a motor. It is possible, for example, for there to be no need for a circuit breaker 50, nor for the interface component 40; in this case the power supply conductors 59 pass through the cavities 35 of the upstream terminal bar 30 to connect directly to the upstream terminal block 11 of the contactor 10. It is also possible to have no need for an attachment 70, if thermal protection is incorporated into the circuit breaker 50; in this case, the conductors 79 pass through the cavities 65 of the downstream terminal bar 60 to connect directly to the downstream terminal block 12 of the contactor 10.

Furthermore, it is important to note that the role of the contactors 10 and 20 is symmetrical, which means that it is conceivable in an equivalent way, in FIG. 1, to make the upstream connections of the contactors to the upstream terminal block 21 instead of the terminal block 11 or the downstream connections of the contactors to the downstream terminal block 25 instead of to the terminal block 15.

Figure 2:
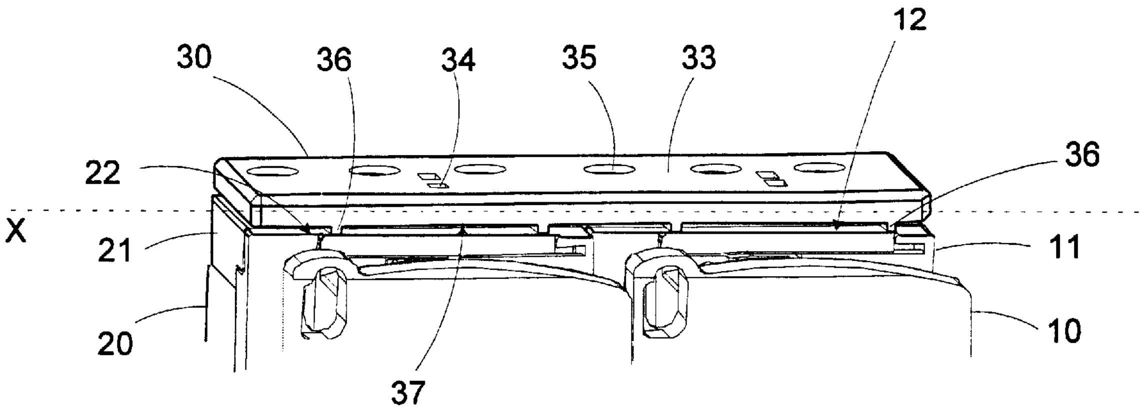
FIGS. 2 and 3 show in detail in rear view the mode of assembly of an upstream pre-wiring terminal bar on two types of contactors of different size.
Figure 3:
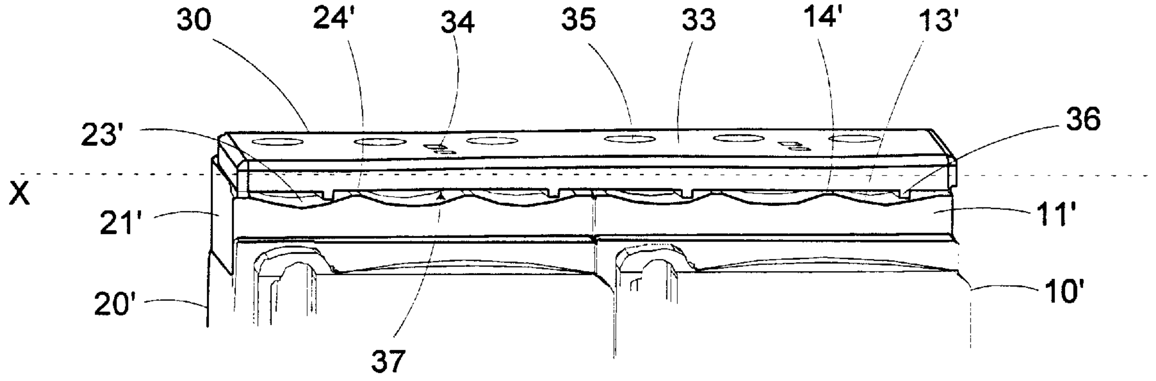

FIG. 2 shows, in rear view, an upstream pre-wiring terminal bar 30 mounted on two contactors 10, 20 of a first type T1. FIG. 3 shows, in rear view, a same upstream terminal bar 30 mounted on two contactors 10', 20' of a second type T2. The upstream terminal bar 30 is coated in insulating material, has an approximately parallelepiped shape, has no great height and a width approximately equal to that of the two contactors placed side by side. It has an upper face 33 and a lower face 37 from which emerge the metal pins 31 intended to be inserted in the housings of the upstream terminal blocks of the contactors. The two types of contactors T1 and T2 are for example of different gauges which entails different dimensions; hence, if the widths of the two types of contactors are approximately the same, the type T2 contactors are, on the other hand, greater in height than the type T1 contactors. Consequently, the upstream terminal blocks 11', 21' of the type T2 contactors 10', 20' are also greater in height than the upstream terminal blocks 11, 21 of the type T1 contactors 10, 20, which could necessitate different lengths of the pins 31 of the upstream terminal bar 30 in order to provide a tight fit in the two types of contactors.

Furthermore, the upper face 12, 22 of an upstream terminal block 11, 21 of a type T1 contactor is plane whereas the upper face of an upstream terminal block 11', 21' of a type T2 contactor has rounded notches 13', 23'. In the example shown in FIG. 3, each contactor 10', 20' comprises one rounded notch 13', 23' per contact pole, and raised flats 14', 24' between each notch. The purpose of the invention is to be able irrespectively for the two types of contactors to:

- tighten appropriately the pins 31 of an upstream terminal bar 30 in each terminal of the upstream terminal block of the contactors while,
- pinning the upstream terminal bar 30 against the upper face of the upstream terminal block of each contactor, so as to provide a solid and reliable connection.

To this end, the upstream terminal bar 30 includes stop means which come into support against the upper face 12, 22 of the upstream terminal block of the type T1 contactors, and which are shielded for the type T2 contactors. These stop means may be to advantage at least two transverse ribs 36 approximately perpendicular to an axis X passing through the housings of the upstream terminal blocks of the contactors, and distributed along the lower plane face 37 of the upstream terminal bar 30. When it is desired to pin an upstream terminal bar on type T1 contactors 10, 20, the ribs 36 of the upstream terminal bar 30 therefore come into support against the upper face 12, 22 of the upstream terminal blocks. When it is desired to pin an upstream terminal bar on type T2 contactors 10', 20', these ribs 36 come to be positioned in the notches 13', 23' and it is directly the lower plane face 37 of the upstream terminal bar 30 which comes into support on the flats 14', 24' located between each notch 13', 23'.

Apart from the fact that it provides a support for the upstream terminal bar which is equivalent for the two types of contactors, this arrangement has the advantage of modulating the length of the pins 31 inserted in the housings of the upstream terminal blocks of the contactors. Indeed, for type T1 contactors, the lower face 37 of the upstream terminal bar is raised relative to the upstream terminal blocks 11, 21 by a height equal to the height of the ribs 36, which, seeing that they are not as high as the terminal blocks 11', 21', allows the pins 31 not to stop in the bottom of the housings of the upstream terminal blocks 11, 21 of the type T1 contactors.

Moreover, the upstream terminal bar 30 has cavities 35 which pass through it on either side in an upwards direction, these cavities being able to be for each contact pole a hole which is cylindrical, rectangular or the like in shape, in such a way that rigid or flexible conductors may freely pass through the upstream terminal bar and be connected directly to the upstream terminal blocks of the contactors.

Figure 4:
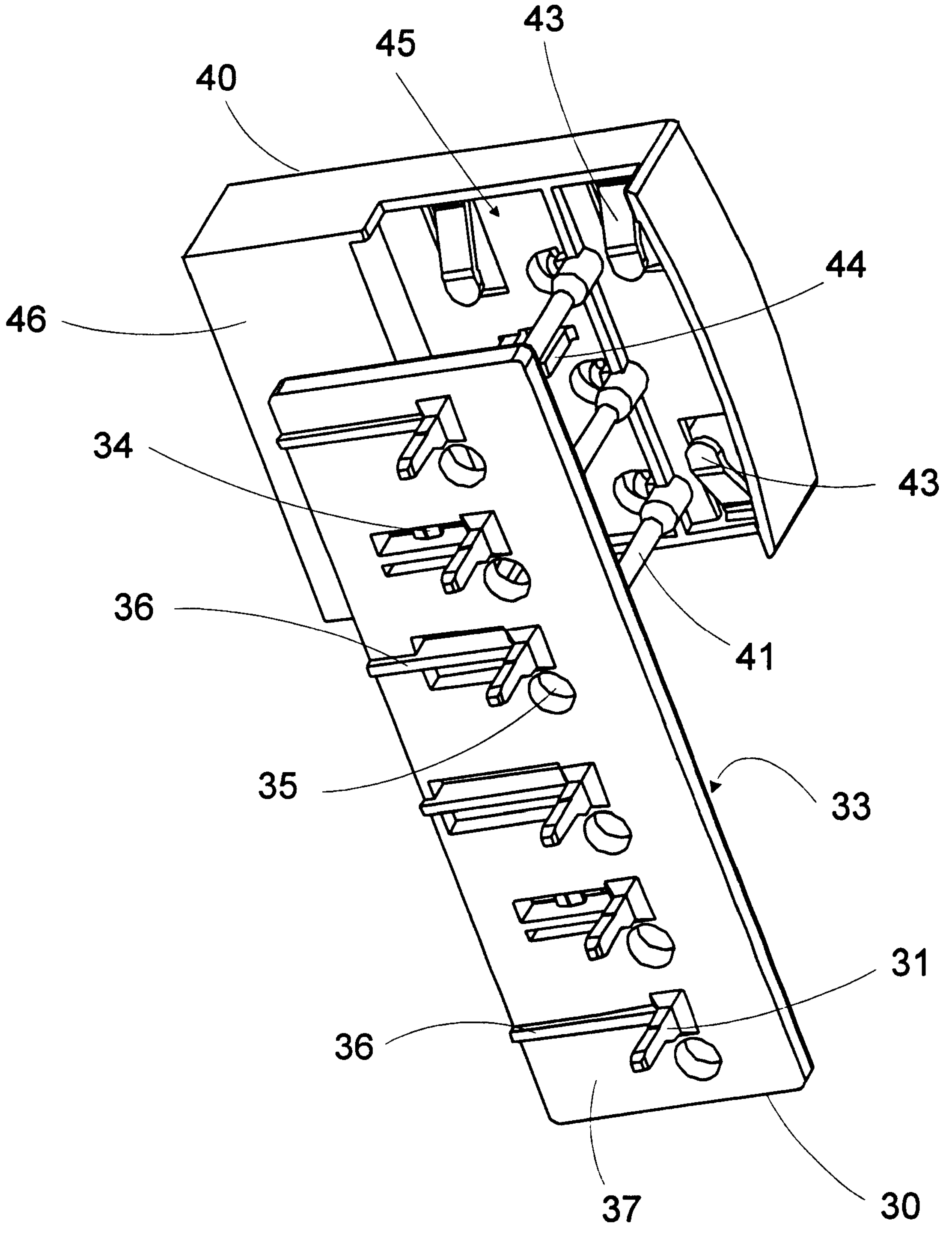
FIG. 4 shows the coupling of an upstream prewiring terminal bar on a contactor/circuit breaker interface component.

In the event of the power circuit comprising, upstream from the contactors, a circuit breaker 50 combined with an interface component 40 between circuit breaker and contactor, the upstream terminal bar may, prior to its connection to the contactors, be coupled by appropriate means to this interface component. As shown in FIG. 4, the interface component 40 has a lower face 46 fitted with a recess 45 of a size adapted to house an upstream terminal bar 30. From this recess 45 emerge the downstream pins 41 which are to be connected to the upstream terminal blocks of the contactors, and the appropriate upstream terminal bar coupling means, these means being, for example, a clip-on mounting 44 coming to engage with a corresponding slot 34 in the upstream terminal bar 30. However, to provide an effective fixing of the upstream terminal bar 30 on the upper face of the upstream terminal blocks 11, 21 of the contactors, the interface component 40 also comprises, in the recess 45 of its lower face 46, resilient means acting as a spring, these means being able to be at least two plastic tabs 43 one end of which is fixed to the interface component 40 and the other end of which is free. When the upstream terminal bar 30 is coupled to the interface component 40, the free ends of the tabs 43 come into contact and exert pressure on the upper face 33 of the upstream terminal bar 30, thus facilitating its pinning on the upstream terminal blocks of the contactors. In the event of the power circuit not comprising a circuit breaker 50 or an interface component 40, the pinning of the upstream terminal bar 30 on the upstream terminal blocks of the contactors may easily be effected by manual pressure on the upper face 33 of the upstream terminal bar before tightening the terminals of the contactors.

Figure 5:
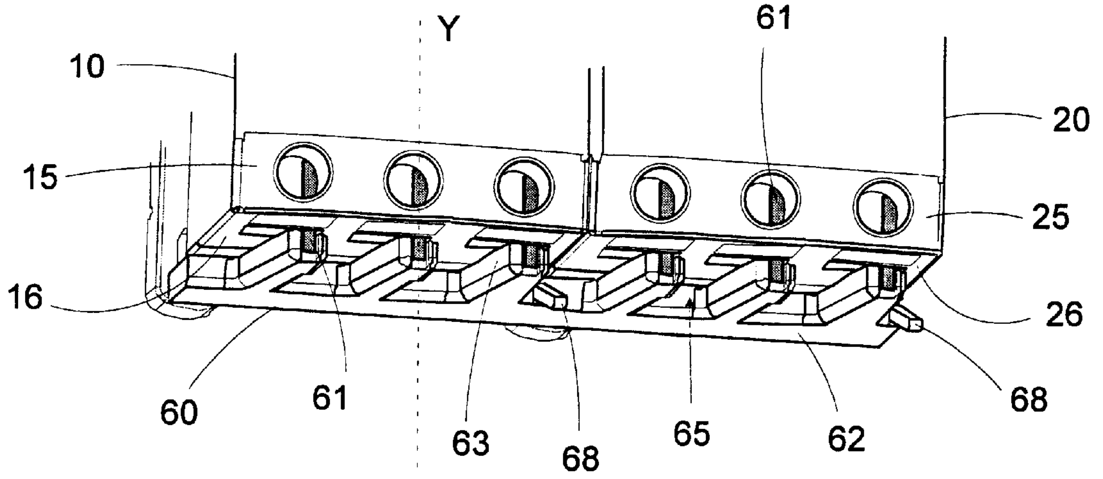
FIGS. 5 and 6 show in detail the mode of assembly of a downstream pre-wiring terminal bar on two types of contactors of different size.
Figure 6:
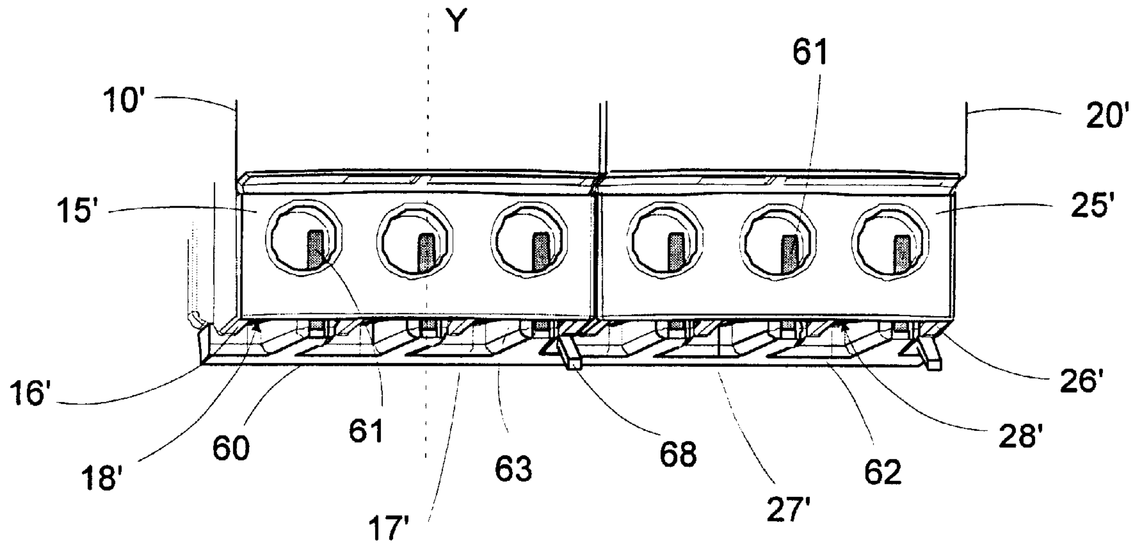

FIG. 5 shows, in front view, a downstream pre-wiring terminal bar 60 installed under two contactors 10, 20 of a first type T1. FIG. 6 shows, in front view, a same downstream terminal bar 60 installed under two contactors 10', 20' of a second type T2. The downstream terminal bar 60 is in the shape of a comb coated in insulating material, comprising a body 62 of a width approximately equal to that of the two contactors placed side by side, and teeth 63. From these teeth 63 emerge metal pins 61 along an axis Y approximately perpendicular to the plane of the downstream terminal bar 60. These metal pins 61 are intended to be inserted in the housings of the downstream terminal blocks of the contactors.

As in the case of the upstream terminal blocks, the downstream terminal blocks 15', 25' of the type T2 contactors 10', 20' are greater in height than the downstream terminal blocks 15, 25 of the type T1 contactors 10, 20. Furthermore, the lower face 16, 26 of a downstream terminal block 15, 25 is plane whereas the lower face 16', 26' of a downstream terminal block 15', 25' has rounded notches 18', 28'. In the example shown in FIG. 6, each contactor 10', 20' comprises one rounded notch 18', 28' per contact pole, and flats 17', 27' raised between each notch. The purpose of the invention is to be able irrespectively for the two types of contactors to:

- tighten appropriately the pins 61 of a downstream terminal bar 60 in each terminal of the downstream terminal block of the contactors while,
- pinning the downstream terminal bar 60 against the lower face of the downstream terminal block of each contactor, so as to provide a solid and reliable connection.

To this end, the dimensions of the teeth 63 of the downstream terminal bar 30 are adapted so that they can just as well come into support against the lower plane face 16, 26 of the downstream terminal blocks of the type T1 contactors 10, 20 and so that they can come into support in the notches 18', 28' provided on the lower face 16', 26' of the downstream terminal blocks of type T2 contactors 10', 20'.

Apart from the fact that it provides a support for the downstream terminal bar which is equivalent for the two types of contactors, this arrangement has the advantage of modulating the length of the pins 61 inserted in the housings of the downstream terminal blocks of the contactors. Indeed, for type T2 contactors, since the teeth 63 are pinned in the notches 18', 28' and not against the lower face 16', 26' of the downstream terminal blocks 15', 25', the pins 61 are inserted more deeply than in type T1 contactors, the difference being about equal to the height of the notches 18', 28' relative to the lower face 16', 26'. This allows there to be in both cases a sufficient insertion of the pins 61 of the downstream terminal bar 60 to provide a reliable connection.

Between each tooth 63, the downstream terminal bar 60 has cavities 65 of sufficient width to allow rigid or flexible conductors to pass freely through the downstream terminal bar and thus to connect directly to the downstream terminal blocks of the contactors.

In the event of the power circuit comprising, downstream from the contactors, an attachment 70, the downstream terminal bar 60 comprises resilient means which facilitate its pinning against the lower face of the downstream terminal blocks of the contactors. In the example shown in FIGS. 5 and 6, these resilient means are constituted by at least one plastic tab 68 acting as a spring, one end of which is fixed on the body 62 of the downstream terminal bar 60 and the other end of which is free and is supported on the attachment 70 thus exerting pressure on the downstream terminal bar 60. In the event of the power circuit not comprising an attachment 70, the pinning of the downstream terminal bar 60 against the downstream terminal blocks of the contactors may easily be effected by manual pressure on the downstream terminal bar before tightening the terminals of the contactors.

What is claimed is:

1. A pre-wiring device to create a logic function between at least two multi-pole contactors (10, 20) located side by side, including an upstream pre-wiring terminal bar (30) coated in insulating material, installed on said contactors and fitted with metal pins (31) able to be inserted in the housings of the upstream wiring terminal blocks of the contactors, characterised in that this upstream terminal bar (30) includes on its lower face (37) stop means which come into support on the upper plane surface (12, 22) of the upstream terminal blocks (11, 21) of a first type of contactors (10, 20) and which are shielded on a second type of contactors (10', 20') the upper face of which has adapted notches (13', 23').

2. A pre-wiring device according to claim 1, characterised in that the stop means of the upstream terminal bar (30) are constituted by at least two transverse ribs (36) approximately perpendicular to an axis (X) passing through the housings of the upstream terminal blocks of the contactors, lower in width and height than the notches (13', 23') provided on the upper face of the upstream terminal blocks of the second type of contactors.

3. A pre-wiring device according to claim 1, characterised in that the upstream terminal bar (30) may, prior to its connection to the contactors, be coupled by appropriate means to an interface component (40), such as a connection component between circuit breaker and contactor, having metal pins (41) intended to be inserted in the housings of the upstream terminal blocks of the contactors.

4. A pre-wiring device according to claim 3, characterised in that the interface component (40) comprises on its lower face resilient means allowing the upstream terminal bar (30) to be pinned on the upper face of the upstream terminal blocks of the contactors.

5. A pre-wiring device according to claim 4, characterised in that the resilient means of the interface component are constituted by at least two plastic tabs (43) acting as a spring, located on either side of the lower face of the interface component (40).

6. A pre-wiring device according to claim 1, also including a downstream pre-wiring terminal bar (60) installed under the contactors and constituted by a comb coated in an insulating material and equipped with teeth (63) from which emerge, along a direction (Y) approximately perpendicular to the plane of the downstream terminal bar, metal pins (61) able to be inserted in the housings of the downstream terminal blocks of the contactors characterised in that the teeth (63) of this downstream terminal bar (60) come into support against the lower plane face (16, 26) of the downstream terminal blocks (15, 25) of a first type of contactors (10, 20) and in notches (18', 28') provided on the lower face (16', 26') of the downstream terminal blocks (15', 25') of a second type of contactors (10', 20').

7. A pre-wiring device according to claim 6, characterised in that the downstream terminal bar (60) comprises resilient means allowing it to pinned against the lower face of the downstream terminal blocks of the contactors, when an attachment (70), such as a thermal relay, is to be connected downstream from the contactors.

8. A pre-wiring device according to claim 7, characterised in that the resilient means of the downstream terminal bar are constituted by at least one plastic tab (68) acting as a spring, which comes to be supported on the attachment (70) connected downstream from the contactors.

* * * * *